United States Patent Office 3,376,298
Patented Apr. 2, 1968

3,376,298
PIGMENT DYES
Willy Braun, Heidelberg, and Rolf Mecke, Ludwigshafen (Rhine), Germany, assignors to Badische Anilin- & Soda-Fabrik Aktiengesellschaft, Ludwigshafen (Rhine), Germany
No Drawing. Filed Apr. 6, 1964, Ser. No. 357,797
Claims priority, application Germany, Apr. 26, 1963, B 71,659
4 Claims. (Cl. 260—244)

This invention relates to new organic pigment dyes.

Among the many requirements which the properties of organic pigment dyes must satisfy, high color strength, high fastness to light and good solvent fastness are particularly important. Moreover it is required of organic pigments, particularly those of the yellow series, that they should have the smallest possible tendency to become darker. Prior art yellow to red organic pigments leave much to be desired as regards these high requirements. There is therefore a demand for yellow to red pigments which will have the said properties in a high degree.

The object of this invention is to provide new valuable pigment dyes which are distinguished by high color strength, high fastness to light and very good solvent fastness and of which even the yellow dyes have only very slight tendency to become darker. The preferred pigment dyes have the general formula:

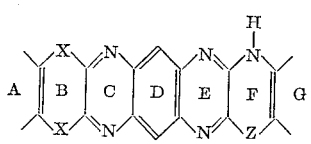

in which one X denotes a —NH— bridge and the other X and Z denote the bridge member —NH—, —O— or —S—, the radicals A and G condensed onto the rings B and F denote aromatic of heterocyclic radicals consisting of one or more rings and in which the rings A, D and G may bear substituents.

Pigment dyes having the general formula:

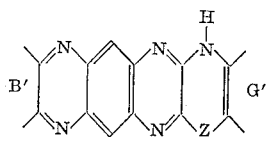

in which Z has the meaning given above, B' denotes a divalent aromatic radical, such as a radical having one of the formulae:

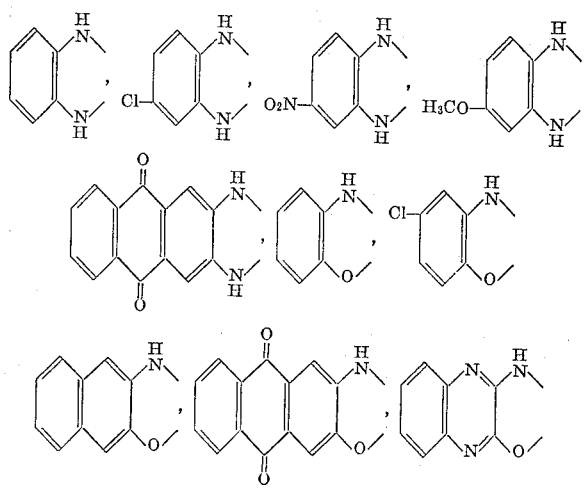

and G' denotes a divalent aromatic radical, such as a radical having one of the formulae:

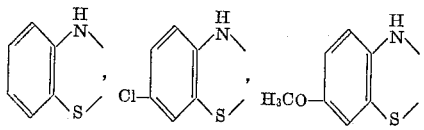

are of particular industrial interest.

The new pigment dyes are obtained by condensing a derivative of 2,3-dihaloquinoxaline having the formula

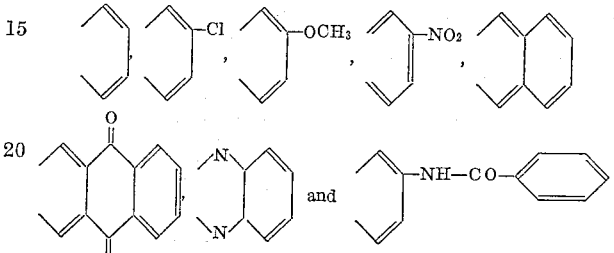

II with a compound having the formula:

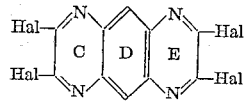

or, when both X and Z in Formula I denote —NH—, by condensing a 2,3-dihaloquinoxaline having the formula:

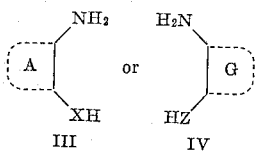

with the compound:

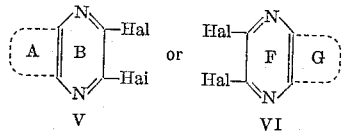

VII

Hal in Formulae II, V and VI denoting a halogen atom, preferably a chlorine atom or bromine atom.

The process may be carried out so that 2,3,7,8-tetrahalopyrazino-[2,3-g]-quinoxalines which may bear substituents in 5- and/or 10-position, for example nitro groups, amino groups, acylamino groups, sulfonamide groups, alkyl groups, such as methyl groups, alkoxy groups, such as methoxy groups, or halogen atoms, such as chlorine atoms, are used as derivatives of 2,3-dihaloquinoxalines, and aromatic or heterocyclic amino compounds which bear in ortho-position to the amino group a further amino group, a hydroxyl group or a sulfhydryl group (examples are 1,2-diamino, 1,2-aminohydroxy and/or 1,2-aminomercapto compounds) are used as reactants. The aromatic or heterocyclic 1,2-diamino, 1,2-aminohydroxy and 1,2-aminomercapto compounds may consist of one or more rings. The following are suitable for example: o-diamino, o-aminohydroxy and o-aminomercapto derivatives of benzene, naphthalene, anthracene, phenazine, phenoxazine, quinoxaline or of anthraquinone, which may contain other substituents, for example nitro groups, amino groups, acylamino groups, such as acetylamino or benzoylamino groups, sulfonamide groups, alkyl groups, such as methyl groups or ethyl groups, alkoxy groups, such as methoxy groups, or halogen atoms, such as chlorine atoms or bromine atoms. The following are specific examples of these compounds: o-phenylene diamine, 1,2-diamino-4-chlorobenzene, o-aminophenol, 2-amino-4-chlorophenol, 1-amino-2-mercapto - 4 - methoxybenzene, 2-amino-3-hydroxynaphthalene, 2,3-diaminoanthraquinone, 2-amino-3-hydroxyquinoxaline, 2,3-diaminophenazine, 2-amino-3-hydroxyphenazine, 2-amino - 3 - hydroxyphenazine, 2-amino-3-hydroxyphenoxazine, 2,3-diaminoquinoxaline and 2-amino-3-mercaptoquinoxaline.

The condensation for the production of the new dyes is advantageously carried out by reacting the said 2,3,7,8-tetrahalopyrazine - [2,3 - g]-quinoxalines, preferably the tetrachloro derivative, with about twice the molar amount of the said aromatic or heterocyclic 1,2-diamino, 1,2-aminohydroxy or 1,2-aminomercapto compounds in the presence of organic solvents and/or diluents and if necessary in the presence of acid-binding agents at temperatures of 60° to 200° C.

When twice the molar amount (with reference to the tetrahalopyrazino-[2,3-g]-quinoxaline used) of the same amino compound is used, compounds having the general Formula I are obtained in which both bridging groups X and Z are the same and the radicals A and G are the same.

The condensation may however also be carried out by first reacting 2,3,7,8-tetrahalopyrazino - [2,3-g] - quinoxaline with only about the molar amount of an aromatic or heterocyclic amino compound of the above-mentioned type in the manner described above and then reacting the condensation product formed, which need not be isolated, with another about molar equivalent of another aromatic or heterocyclic amino compound of the above-mentioned type. Compounds are then obtained having the general Formula I in which one bridging group X is different from Z and/or the radicals A and G are different from each other.

Compounds of the general Formula I in which both groups X and Z denote —NH— may also be obtained by the process according to this invention by reacting under the above-mentioned conditions a 2,3-di-haloquinoxaline which may contain substituents in 5-, 6-, 7- and/or 8-position, for example nitro groups, amino groups, acylamino groups, such as acetylamino groups or benzoylamino groups, sulfonamido groups, alkyl groups, such as methyl groups or ethyl groups, alkoxy groups, such as methoxy groups, or halogen atoms, such as chlorine atoms or bromine atoms, or condensed-on aromatic or heterocyclic rings, with about half the molar amount of 1,2,4,5-tetraaminobenzene which may contain substituents, for example nitro groups, amino groups, acylamino groups, sulfonamido groups, alkyl groups, such as methyl groups, alkoxy groups, such as methoxy groups, or halogen atoms, such as chlorine atoms, in 3-position and/or in 6-position.

The process according to this invention is carried out in the presence of organic solvents and/or diluents. It is advantageous to use solvents or diluents of high boiling point which do not react under the conditions of the reaction, such as nitrobenzene or chlorinated benzenes. Dialkyl carboxylic amides, such as dimethylformamide or N-methylpyrrolidone, are particularly suitable.

Since hydrogen halide is formed in the condensation, it is often advantageous to add acid-binding agents to the reaction mixture. Organic or inorganic bases may be used as acid-binding agents. Examples are alkali metal carbonates or alkaline earth metal carbonates, such as sodium carbonate, potassium carbonate, sodium hydrogen carbonate, potassium hydrogen carbonate or magnesium carbonate. Aliphatic, aromatic or heterocyclic tertiary amines, such as tripropylamine, tri-n-butylamine, N,N-dimethylaniline, pyridine or quinoline, are also suitable. Instead of an acid-binding agent being added, it is also possible to use an excess of the o-diamino, o-aminohydroxy or o-aminomercapto compound used, the amino groups of the substance added in excess thus binding the hydrohalic acid liberated. Finally in some cases the addition of an acid-binding agent may be wholly dispensed with. The hydrohalic acid liberated then either escapes in gaseous form or dissolved in the solvent or diluent.

The condensation proceeds generally in the temperature range from 60° to 200° C. It is preferably to choose temperatures of from 100° to 200° C., but the condensation takes place in some cases, for example when using o-aminomercapto compounds, at temperatures of 60° to 100° C. The condensation products are insoluble or sparingly soluble in organic solvents. They may therefore be separated from the cooled reaction mixture by simple filtration. To purify them, they may be boiled up with organic solvents or precipitated from sulfuric acid solution by dilution with water.

2,3,7,8 - tetrachloropyrazino-[2,3-g]-quinoxaline to be used as initial material for the process of this invention may be obtained by reaction of 1,2,4,5-tetraaminobenzene with oxalic acid in aqueous hydrochloric acid solution and subsequent treatment of the product obtained with chlorinating agents, such as phosphorus pentachloride, phosphorus oxychloride, phosgene or thionyl chloride. The course of the reaction is illustrated by the following equation:

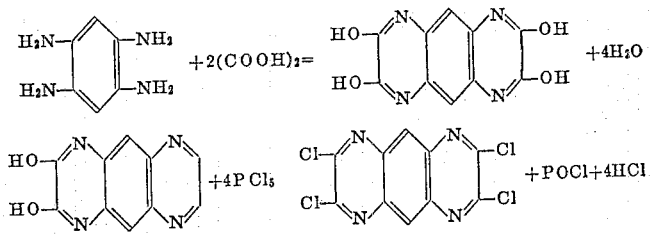

The dyes obtainable according to this invention have vivid brightness, great color strength and outstanding fastness properties. They are eminently useful as yellow to bluish red pigment dyes for coloring plastics and lacquers and for paints and printing pastes.

Several tautomeric forms of the Formula I are conceivable. Thus for example by reacting two moles of 1,2-diaminobenzene with one mole of 2,3,7,8-tetrachloropyrazino-[2,3-g]-quinoxaline, the same product is obtained as by the reaction of two moles of 2,3-di-chloroquinoxaline with one mole of 1,2,4,5-tetraaminobenzene. It is also conceivable that the compounds obtainable by the process of this invention may be present as mixtures of the two possible isomers Ia and Ib:

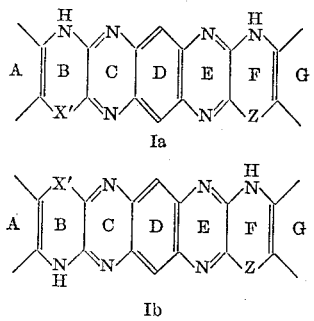

in which X' denotes the bridge member —NH—, —O— or —S— and Z, A and G have the meanings given above.

The following examples will further illustrate this invention but the invention is not restricted to these examples. The parts specified in the examples are parts by weight.

Example 1

200 parts of the tetrahydrochloride of 1,2,4,5-tetraaminobenzene is boiled for one hour in 2000 parts of 10% hydrochloric acid with 193 parts of oxalic acid. After the whole has been cooled, the precipitate is suction filtered and washed with water. 160 parts of 2,3,7,8-tetrahydroxypyrazino-[2,3-g]-quinoxaline is obtained in the form of small needles which decompose above 300° C. without melting.

100 parts of 2,3,7,8-tetrahydroxypyrazino-[2,3-g]-quinoxaline is slowly heated in 500 parts of nitrobenzene with 445 parts of phosphorus pentachloride to 150° C. in the course of an hour, the phosphorus oxychloride formed being distilled off through a descending condenser. After a total of two hours, the mixture is cooled. The residue is suction filtered and washed with benzene. 93 parts of 2,3,7,8 - tetrachloropyrazino - [2,3-g] - quinoxaline is obtained as pale yellowish needles which melt at 315° to 316° C.

32 parts of 2,3,7,8-tetrachloropyrazino-[2,3-g]-quinoxaline is stirred with 22 parts of o-phenylene diamine and 49 parts of N,N-dimethylaniline in 350 parts of N-methylpyrrolidone for two hours at 200° C. After the whole has been cooled, the residue is filtered off and washed with methanol. 36 parts of a red dye having the constitution:

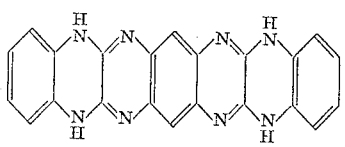

is obtained.

Examples 2 to 5

By using corresponding amounts of the o-diamines specified in the following table instead of 22 parts of o-phenylene diamine and otherwise proceeding as described in Example 1, dyes having analogous constitution are obtained having the shades indicated in the table.

TABLE

| Example | o-Diamine | Color |
| --- | --- | --- |
| 2 | 4-chloro-1,2-diaminobenzene | Red. |
| 3 | 4-nitro-1,2-diaminobenzene | Orange red. |
| 4 | 4-methoxy-1,2-diaminobenzene | Red. |
| 5 | 2,3-diaminoanthraquinone | Bluish red. |

Example 6

28.4 parts of the tetrahydrochloride of 1,2,4,5-tetraaminobenzene is stirred with 40 parts of 2,3-dichloroquinoxaline and 115 parts of tripropylamine in 400 parts of N-methylpyrrolidone under nitrogen for two hours at 160° to 170°. The whole is cooled and the residue is filtered off and washed with methanol. 30 parts of a red dye is obtained which is identical with the dye obtainable according to Example 1.

Example 7

32 parts of 2,3,7,8-tetrachloroquinoxalino-[2,3-g]-pyrazine is stirred for two hours at 150° C. with 22 parts of o-aminophenol and 17.5 parts of sodium hydrogen carbonate in 300 parts of dimethylformamide. The whole is cooled and the residue is filtered off and washed with methanol and water. 32 parts of a yellow dye having the constitution:

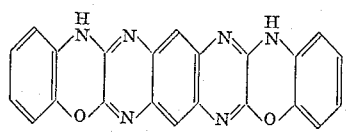

is obtained.

Examples 8 to 11

By following the procedure described in Example 7 but using equivalent amounts of the o-aminohydroxy compounds specified in the following table instead of 22 parts of o-aminophenol, dyes having an analogous constitution are obtained having the shades specified in the table:

TABLE

| Example | o-Aminohydroxy compound | Color |
| --- | --- | --- |
| 8 | 2-amino-4-chlorophenyl | Yellow. |
| 9 | 2-amino-3-hydroxynaphthalene | Orange. |
| 10 | 2-amino-3-hydroxyanthraquinone | Red. |
| 11 | 2-amino-3-hydroxyquinoxaline | Orange. |

Example 12

32 parts of 2,3,7,8-tetrachloroquinoxalino-[2,3-g]-pyrazine is heated with 25 parts of o-aminothiophenol in 250 parts of dimethylformamide under nitrogen for one hour at 120° C. The whole is cooled and the residue is filtered off and washed with methanol. 41 parts of a bluish red dye is obtained having the constitution:

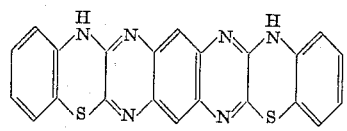

Examples 13 to 16

By following the procedure described in Example 12 but using equivalent amounts of the o-aminomercapto compounds specified in the following table instead of 25 parts of o-aminothiophenol, dyes having analogous constitution are obtained having the shades given in the table:

TABLE

| Example | o-Aminomercapto compound | Color |
| --- | --- | --- |
| 13 | 1-amino-2-mercapto-4-chlorobenzene | Bluish red. |
| 14 | 1-amino-2-mercapto-4-methoxybenzene | Do. |
| 15 | 1-amino-2-mercapto-4-benzoylaminobenzene | Do. |
| 16 | 2-amino-3-mercaptonaphthalene | Do. |

Example 17

32 parts of 2,3,7,8-tetrachloropyrazino-[2,3-g]-quinoxaline and 11 parts of o-phenylene diamine are stirred in 300 parts of dimethylformamide for two hours at 150° C. Then 12.5 parts of o-aminothiophenol is added and the whole heated for another hour at 150° C. The whole is cooled and the residue suction filtered and washed with methanol. 36 parts of a red dye is obtained having the constitution:

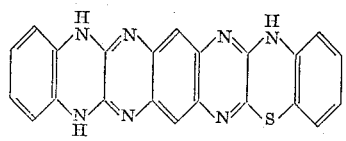

Example 18

32 parts of 2,3,7,8-tetrachloropyrazino-[2,3-g]-quinoxaline and 22 parts of o-aminophenol are heated in 350 parts of o-dichlorobenzene for one hour at 170° C. The whole is cooled and the residue is filtered off and washed with benzene and methanol. 35 parts of a yellow compound is obtained having the constitution:

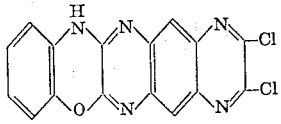

35 parts of this intermediate product is heated with 12.5 parts of o-aminothiophenol in 300 parts of dimethylformamide for one hour at 120° C. The whole is cooled and the residue is filtered off and washed with methanol. 35 parts of a red dye is obtained having the constitution:

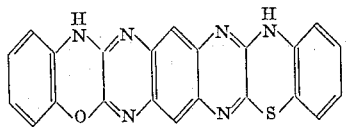

We claim:
1. A dye of the formula

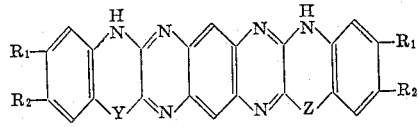

wherein Y and Z each represent a bridge member selected from the group consisting of —NH—, —O— and —S—, $R_1$ and $R_2$ each represent a substituent selected from the group consisting of —H, —Cl, —OCH$_3$, —NO$_2$ and benzoylamino with the proviso that at least one of said $R_1$ and $R_2$ is hydrogen, and wherein $R_1$ and $R_2$ taken together may further represent a divalent radical selected from the class consisting of

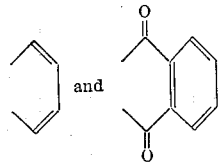

2. The dye of the formula:

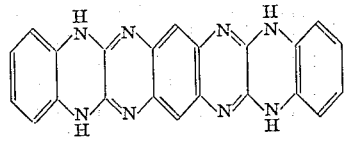

3. The dye of the formula:

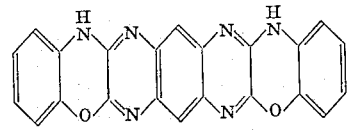

4. The dye of the formula:

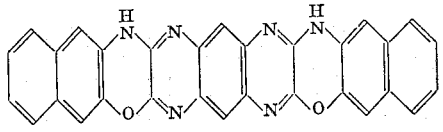

References Cited
UNITED STATES PATENTS 3,006,917  10/1961  Seeger _____ 260—244

JOHN D. RANDOLPH, *Primary Examiner.*

WALTER A. MODANCE, *Examiner.*

R. T. BOND, *Assistant Examiner.*